Figure 1:
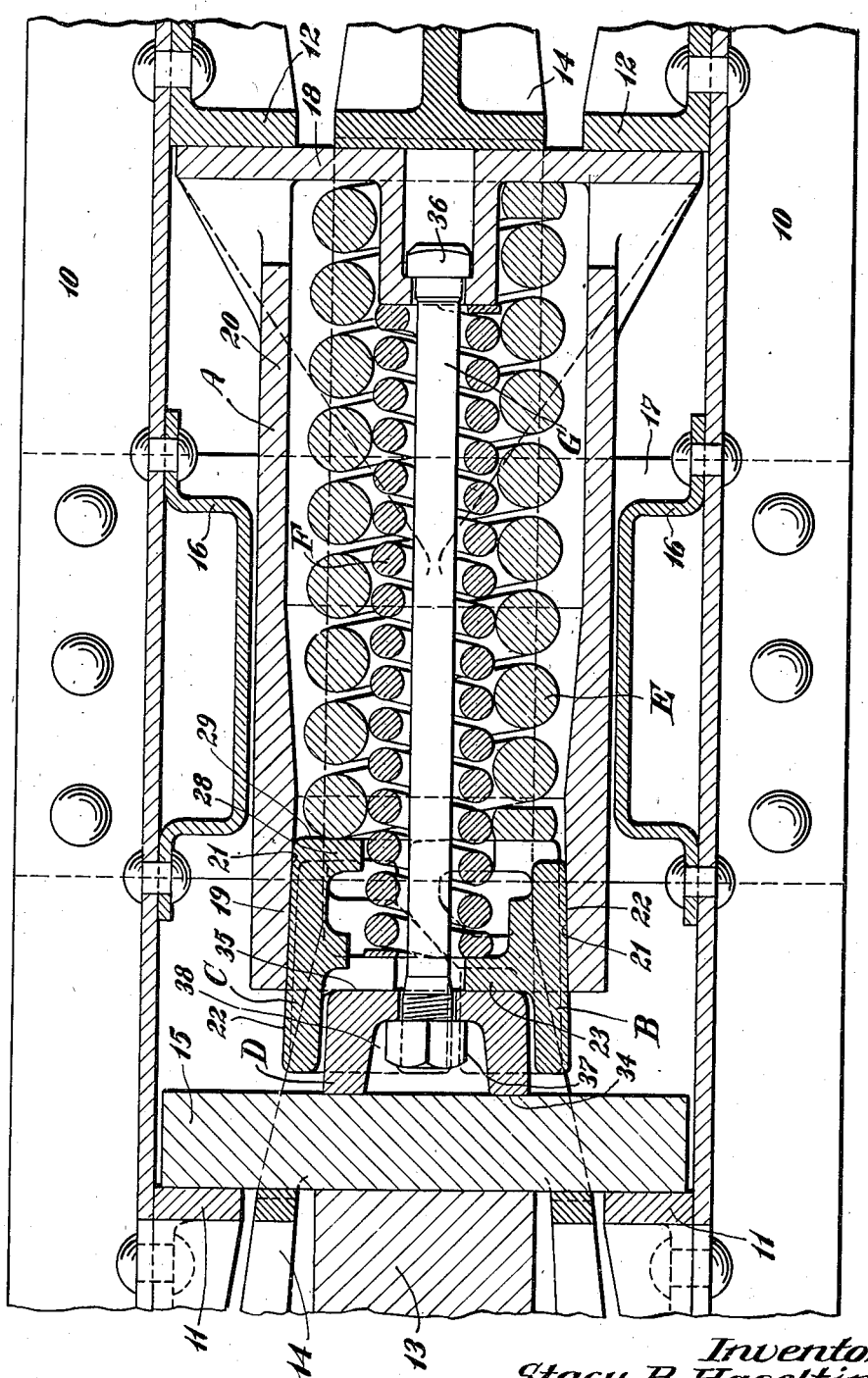

Dec. 2, 1941.　　　S. B. HASELTINE　　　2,264,526
FRICTION SHOCK ABSORBING MECHANISM
Filed Aug. 16, 1939　　　4 Sheets-Sheet 1

Inventor
Stacy B. Haseltine
By Henry Fuchs
Atty.

Dec. 2, 1941.  S. B. HASELTINE  2,264,526
FRICTION SHOCK ABSORBING MECHANISM
Filed Aug. 16, 1939  4 Sheets-Sheet 2
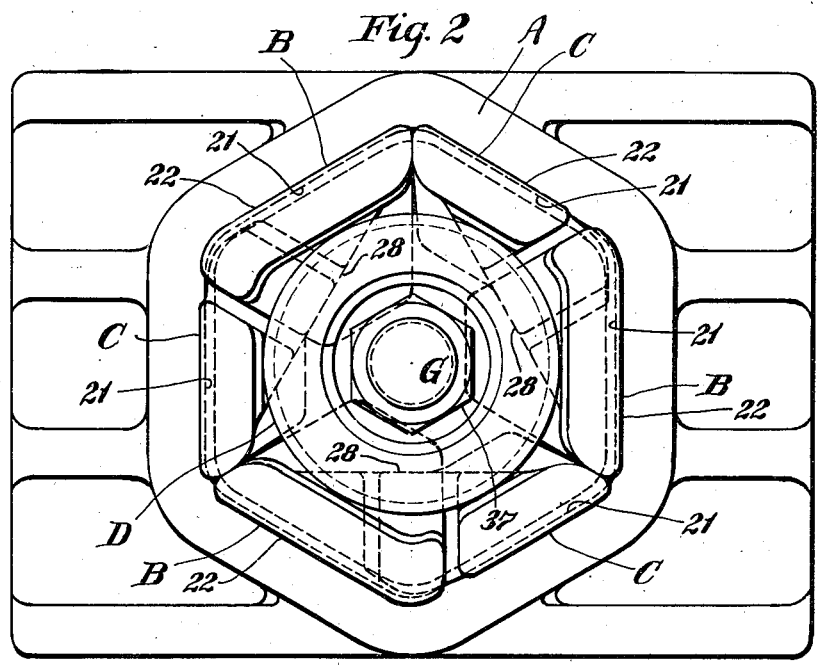
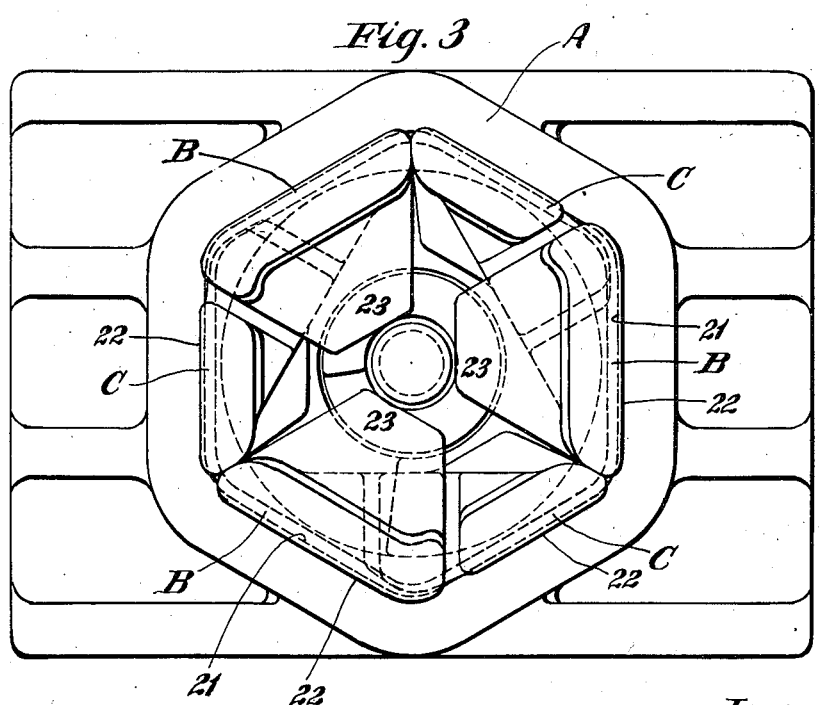
Inventor
Stacy B. Haseltine
By Henry Fuchs
Atty.

Dec. 2, 1941.   S. B. HASELTINE   2,264,526
FRICTION SHOCK ABSORBING MECHANISM
Filed Aug. 16, 1939   4 Sheets-Sheet 3
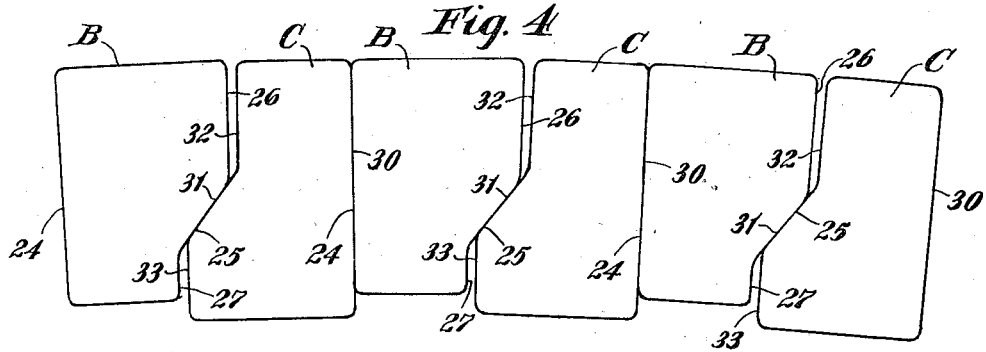
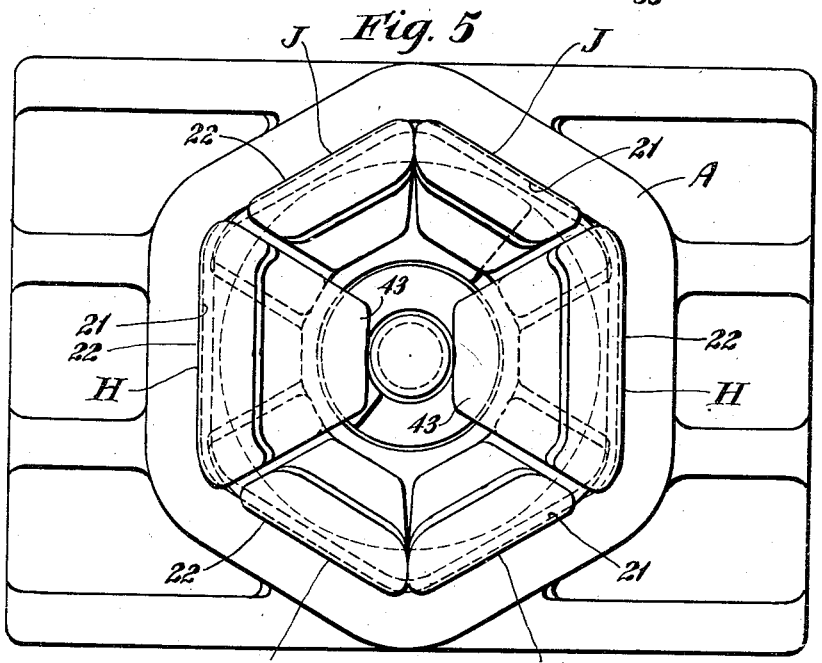
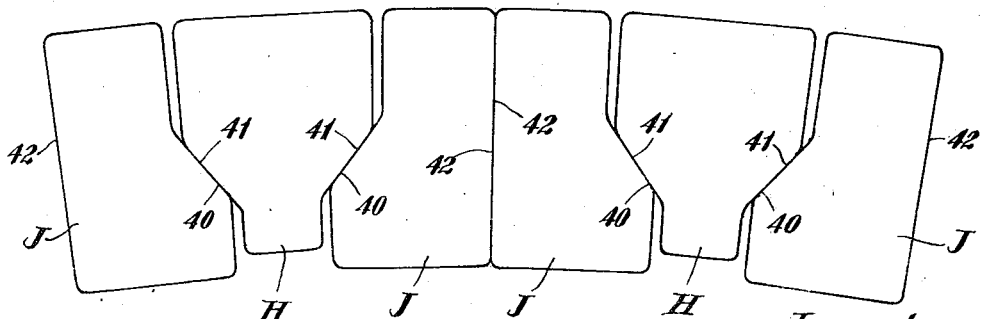
Inventor
Stacy B. Haseltine
By Henry Fuchs
Atty.

Dec. 2, 1941.  S. B. HASELTINE  2,264,526
FRICTION SHOCK ABSORBING MECHANISM
Filed Aug. 16, 1939   4 Sheets-Sheet 4
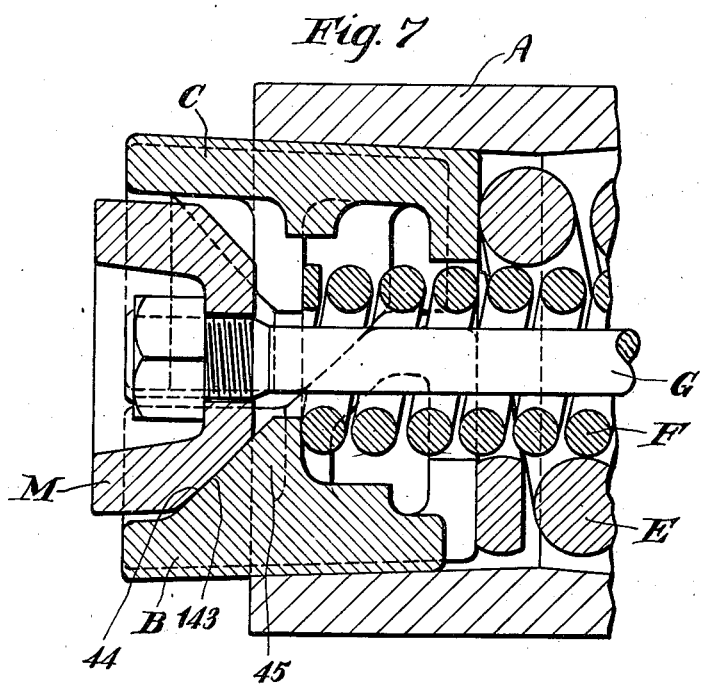
Inventor
Stacy B. Haseltine
By Henry Fuchs
Atty.

Patented Dec. 2, 1941

2,264,526

UNITED STATES PATENT OFFICE 2,264,526

FRICTION SHOCK ABSORBING MECHANISM

Stacy B. Haseltine, La Grange, Ill., assignor to W. H. Miner, Inc., Chicago, Ill., a corporation of Delaware Application August 16, 1939, Serial No. 290,351

14 Claims. (Cl. 213—32)

This invention relates to friction shock absorbing mechanisms.

One object of the invention is to provide a friction shock absorbing mechanism of high capacity, especially adapted for railway draft riggings.

Another object of the invention is to provide a friction shock absorbing mechanism of high capacity and having easy release, wherein the high capacity is produced by a plurality of friction wedge shoes having wedging engagement with each other, and frictional engagement with a column element.

A more specific object of the invention is to provide in a mechanism as set forth in the preceding paragraph, spring means yieldingly resisting movement of the friction wedge shoes, comprising a set of coil springs, one of which acts on certain of the shoes to separate the same from wedging engagement with the remaining shoes and thus facilitate release of the device when the actuating pressure is reduced.

Other objects of the invention will more clearly appear from the description and claims hereinafter following.

In the drawings forming a part of this specification, Figure 1 is a horizontal, longitudinal, sectional view through a portion of the underframe structure of a railway car, illustrating my improvements in connection therewith. Figure 2 is a front end elevational view, on an enlarged scale, of the friction shock absorbing mechanism proper shown in Figure 1. Figure 3 is a view similar to Figure 2 with the pressure transmitting member omitted. Figure 4 is a diagrammatic plan view of a development of the friction wedge shoes of the mechanism shown in Figures 1, 2 and 3. Figure 5 is a view similar to Figure 3, illustrating another embodiment of the invention. Figure 6 is a diagrammatic plan view of a development of the friction wedge shoes of the mechanism disclosed in Figure 5. Figure 7 is a view similar to Figure 1, of the front end portion of the friction shock absorbing mechanism, illustrating still another embodiment of the invention, said view being on an enlarged scale.

In said drawings, 10—10 indicate the usual longitudinally disposed center or draft sills of a railway car underframe, to the inner sides of which are secured front stop lugs 11—11 and rear stop lugs 12—12 of well-known form. The inner end portion of the drawbar is indicated by 13. A hooded yoke 14 of well-known form is operatively connected to the drawbar 13, and the friction shock absorbing mechanism and front main follower plate 15 of the draft rigging are disposed within the yoke 14. The friction shock absorbing mechanism is of the character employing a friction shell or casing and is held centered between the sills by the usual guide plates or brackets 16—16 fixed to the inner sides of the sills 10—10. The yoke in turn is slidingly supported by a saddle plate 17 secured to the underneath sides of the bottom flanges of the sills 10—10.

Referring first to the embodiment of the invention illustrated in Figures 1 to 4 inclusive, the friction shock absorbing mechanism shown comprises broadly a combined friction shell and spring cage casting A; six friction wedge shoes, comprising a set of three similar shoes B—B—B and a second set of three similar shoes C—C—C; a pressure transmitting member or block D; a pair of springs E and F; and a retainer bolt G.

The combined friction shell and spring cage is in the form of a casing of substantially hexagonal transverse cross section, open at its front end and closed at its rear end by a transverse vertically disposed wall 18, which is extended beyond the sides of the casing, as clearly shown in Figure 1, to provide a rear follower member integral therewith adapted to cooperate with the rear stop lugs 12—12 in the manner of the usual rear follower.

The rear wall 18 is provided on the inner side thereof with an inwardly projecting hollow boss for a purpose hereinafter pointed out.

The friction shell section of the casing A is formed at the open front end thereof and the spring cage proper rearwardly of said shell section. The friction shell section, which is indicated by 19, as well as the spring cage, which is indicated by 20, are preferably of hexagonal, transverse, interior contour. The friction shell presents six interior, substantially flat, longitudinally extending friction surfaces 21—21 which are converged slightly inwardly of the mechanism.

The three friction shoes B—B—B are of identical design and are alternated with the shoes C—C—C. Each shoe B is in the form of a block or plate having a flat outer friction surface 22 adapted to cooperate with one of the friction surfaces 21 of the friction shell section 19 of the casing A. On the inner side, each shoe B is provided with an inwardly projecting flange or shelf 23, which is located between the front and rear ends of said shoes. The flange 23 presents front and rear flat abutment faces, as most clearly disclosed in Figure 1, the front face, as shown, being of greater extent than the rear face. The left hand side edge of each shoe B as seen in Figure 4, is substantially straight and lies in a plane radial to the longitudinal central axis of the mechanism, as indicated most clearly in Figures 2 and 3, said edge face being indicated by 24. On the right hand side edge, as seen in Figure 4, each shoe B is provided with a rearwardly facing, inclined wedge face 25, which is near the inner edge of said shoe. The last named edge of the shoe B has substantially flat faces 26—27 forwardly and rearwardly of said face 25.

The three shoes C—C—C are also of identical design. Each shoe C is in the form of a block or plate having a substantially flat, outer friction surface, similar to the friction surface of the shoe B hereinafter described, said surface also being indicated by 22. The rear end of each shoe C is laterally inwardly enlarged, as indicated at 28 in Figure 2, said enlargement presenting a flat, transverse, rear abutment face 29, adapted to cooperate with the spring E. The right hand side edge of each shoe C, as seen in Figure 4, is substantially straight and lies in a plane radial to the longitudinal axis of the mechanism, thus presenting a substantially straight, flat friction surface 30 adapted to slidingly engage the face 24 of the adjacent shoe B. At the left hand side edge each shoe C is provided with a forwardly facing wedge face 31, which is near the rear end thereof and adapted to cooperate with the wedge face 25 of the adjacent shoe B. Forwardly and rearwardly of the wedge face 31, the side edge portions of the shoe C are substantially straight, as shown, said edge portions being respectively designated by 32 and 33. Clearance is provided between the edge faces 27 and 33 and 26 and 32 of the shoes B and C to permit a certain amount of contraction of the friction unit of which these shoes form a part.

As shown in Figures 1 and 4, the shoes C—C—C are somewhat longer than the shoes B—B—B and project rearwardly of said last named shoes.

The pressure transmitting block D is of substantially cylindrical cross section and has flat front and rear end faces 34 and 35.

The shoes B—B—B and C—C—C are arranged in an annular group surrounding the longitudinal central axis of the mechanism, the shoes B—B—B being alternated with the shoes C—C—C with the outer friction surfaces 22—22 thereof in sliding contact with the friction surfaces 21—21 of the casing. The pressure transmitting block D extends between said shoes and has its flat front end 34 bearing on the inner side of the front follower 15. The rear end face 35 of said block D bears directly on the flanges 23—23—23 of the three shoes B—B—B. As will be seen upon reference to Figure 1, the pressure transmitting block D fits freely or loosely between the friction wedge shoes B—B—B and C—C—C, sufficient clearance being provided between said block and shoes to permit the necessary contraction of the group of shoes without any danger of binding of the parts of the mechanism during compression of the same.

The springs E and F provide yielding resistance means which opposes movement of the shoes inwardly of the casing. These springs are housed within the spring cage section 20 of the casing and extend into the friction shell section thereof. The spring F which is relatively light has its front and rear ends bearing respectively on the inner sides of the flanges 23—23—23 of the shoes B—B—B, and the front end face of the hollow boss of the rear wall 18 of the casing. The spring E which is heavier than the spring F surrounds the latter and has its front and rear ends bearing respectively on the inner ends of the shoes C—C—C and the rear wall 18 of said casing.

The retainer bolt G extends through the inner coil F of the spring resistance and has its front and rear ends anchored respectively to the pressure transmitting block D and the hollow boss of the rear wall 18 of the casing. As shown, the rear end of the bolt is headed, as indicated at 36, and the front end is provided with the usual nut 37, which is threaded thereon. The head 36 is disposed within the hollow boss at the rear end of the casing and has shouldered engagement with the front wall of said boss, and the nut 37 of said bolt is seated in a recess 38 of the pressure transmitting block D and has shouldered engagement with the inner end wall of said recess. The bolt is adjusted to hold the mechanism under initial compression when the parts are assembled and maintains said mechanism of uniform overall length.

The operation of the improved mechanism illustrated in Figures 1 to 4 inclusive is as follows: Assuming a draft action of the rigging, the yoke 14 is pulled outwardly with the drawbar 13, thereby pulling the shock absorbing mechanism forwardly and compressing the same against the front follower which is held stationary at this time by the front stop lugs 11. The pressure transmitting member D is thus forced inwardly of the casing A. Assuming an inward or buffing stroke is imparted to the drawbar 13, the front follower 15 will be carried rearwardly therewith, thereby forcing the pressure transmitting member D inwardly of the casing A, the latter being at this time held stationary by engagement of the rear follower section 18 thereof with the rear stop lugs 12—12 of the rigging. Thus, during both draft and buffing actions, the pressure transmitting member D is forced inwardly of the casing A. As the pressure transmitting member D moves inwardly of the casing, the wedge shoes B—B—B are forced inwardly through engagement of the flanges 23—23—23 thereof by the member D. The wedge faces 25 of the shoes B—B—B are thus wedged against the faces 31 of the shoes C—C—C, causing the group of shoes B—B—B and C—C—C to expand, thereby bringing the friction faces thereof into tight frictional engagement with the friction surfaces 22—22 of the casing A. At the same time, the shoes are carried inwardly of the casing, against the yielding resistance of the springs E and F. High frictional resistance is thus produced while the shoes slide inwardly on the friction surfaces of the casing. This frictional resistance is augmented due to the converging relation of the friction surfaces 22—22—22 of the casing, the friction unit being forced to contract during its inward movement, thereby causing slippage on the contacting wedge faces 25 and 31 of the shoes B and C and on the engaging flat edge faces 24 and 30, the shoes C—C—C being advanced inwardly of the casing with respect to the shoes B—B—B. Compression of the mechanism is limited by engagement of the front follower 15 with the front end of the casing A, the casing acting as a solid column member to transmit the load to the sills, thus preventing undue compression of the springs E and F.

When the actuating force is reduced, the springs E and F return the parts to the normal full release position shown in Figure 1, collapse of the friction clutch being facilitated by the action of the inner coil spring F, which forces the shoes B—B—B outwardly entirely independently of the shoes C—C—C, thereby forcing the wedge faces of the shoes apart. In other words, the spring F acts as a release spring.

Referring next to the embodiment of the invention illustrated in Figures 5 and 6, the structure is the same as that disclosed in Figures 1 to 4 inclusive, with the exception that the wedging arrangement of the wedge friction shoes is somewhat different. Six shoes are employed, two like shoes H—H and four shoes J—J—J—J. The shoes J are arranged in sets of two, cooperating respectively with the shoes H—H. Each set of shoes J—J is arranged at opposite sides of the corresponding wedge shoe H.

Each shoe H has inwardly facing, rear wedge faces 40—40 which engage with forwardly facing wedge faces 41—41 on the cooperating set of shoes J—J. At the side edge, opposite to that carrying the wedge face 41, each shoe J is provided with a substantially straight edge face 42, extending lengthwise of the mechanism and engaged with the corresponding face 42 of the adjacent shoe J.

Each shoe H is provided on the inner side thereof with an inwardly projecting abutment flange or shelf 43 similar to the flange 23 of the shoe B, hereinbefore described. The flanges 43—43 of the shoes H—H are engaged by the pressure transmitting member in the same manner as the shoes shown in Figures 1 to 4 inclusive and movement of these shoes is resisted by the inner coil spring of the mechanism. As the shoes H—H are forced inwardly of the casing A, the shoes J—J—J—J are carried inwardly therewith through the pressure transmitted from the wedge face 40 to the wedge face 41. At the same time that the group of shoes is expanded due to the wedging action therebetween, the friction faces 22—22 of the shoes will slide along the friction surfaces 21—21 of the casing A against the resistance of the coil springs E and F. The action of the mechanism is thus, in all respects, the same as that of the mechanism hereinbefore described, with the exception that only two shoes, namely, the shoes H—H are contacted by the pressure transmitting member D, and that the remaining four shoes are forced inwardly by the shoes H—H, and that only the two shoes H—H are forced outwardly by the central coil spring F in release of the mechanism.

Referring next to the embodiment of the invention illustrated in Figure 7, the structure is identical with that disclosed in Figures 1 to 4 inclusive except that the pressure transmitting block, which is indicated by M in Figure 7 and which corresponds to the block D, has wedging engagement with the shoes B—B—B, instead of flat surface contact therewith.

The block M has three wedge faces 143—143—143 at the rear end thereof arranged symmetrically about the central longitudinal axis of the mechanism and engaging forwardly facing wedge faces 44—44—44 on the inward enlargements 45 of the shoes B—B—B. The inward enlargements 45 correspond to the flanges 23 of the shoes B and serve as abutments for the front end of the spring F which acts to release the shoes B—B—B independently of the shoes C—C—C.

Inasmuch as the pressure transmitting block M has wedging engagement with the shoes B—B—B, radial outward pressure is exerted on the shoes in addition to the pressure exerted to expand the group of shoes by their wedging engagement with each other.

As is obviously suggested by the disclosure in Figure 7 considered in connection with the disclosure in Figures 5 and 6, the wedge block having wedging engagement with the shoes H—H may be substituted for the pressure transmitting block D which engages said shoes.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing; of a central pressure transmitting element extending into the casing; a plurality of friction wedge shoes surrounding said pressure transmitting element, said shoes having wedging engagement with each other and sliding frictional engagement with said casing, said pressure transmitting element engaging certain of said shoes only to force the same inwardly of the casing; and spring means opposing movement of all of said shoes inwardly of the casing including independently acting spring elements, one of which alone opposes movement of the shoes engaged by said pressure transmitting element.

2. In a friction shock absorbing mechanism, the combination with a friction casing; of a plurality of friction shoes having wedging engagement with each other, all of said shoes having sliding frictional engagement with the casing; a central wedge pressure transmitting member surrounded by said shoes and having wedging engagement with part of said shoes only; and spring means opposing inward movement of said shoes.

3. In a friction shock absorbing mechanism, the combination with a friction casing; of a central wedge element extending into the casing; an anular series of friction wedge shoes surrounding said wedge element, said shoes having wedging engagement with each other and sliding frictional engagement with said casing, certain of said shoes only having wedging engagement with said wedge element; and spring means opposing movement of all of said shoes inwardly of the casing including independently acting spring elements, one of which alone opposes movement of the shoes engaged by said pressure transmitting element.

4. In a friction shock absorbing mechanism, the combination with a friction column member; of an annular series of friction wedge shoes arranged in pairs, the shoes of said pairs having wedging engagement with each other and sliding frictional engagement with said column member, one shoe of each pair receiving the actuating force, both shoes of each pair having engagement with the shoes of the adjacent pairs on faces extending lengthwise of the mechanism parallel to the longitudinal central axis of said mechanism; a spring yieldingly opposing movement of one shoe of each pair; and independent spring resistance means opposing movement of the other shoe of each pair.

5. In a friction shock absorbing mechanism, the combination with a friction casing; of a plurality of friction shoes having sliding frictional engagement lengthwise, inwardly of said friction casing, said shoes being arranged in adjacent pairs, the shoes of each pair having wedging engagement with each other along one set of side edges, one of the shoes of each pair receiving the actuating force, the shoes of each pair having longitudinal sliding edge contact with the shoes of the adjacent pairs along their remaining side edges; and spring means yieldingly opposing movement of said shoes lengthwise of the casing.

6. In a friction shock absorbing mechanism, the combination with a friction casing; of an annular series of friction shoes having sliding frictional engagement with said casing, said shoes being arranged in adjacent pairs, said pairs of shoes being slidable with respect to each other lengthwise of the mechanism, parallel to the longitudinal axis of said casing, one shoe of each pair receiving the actuating force and having wedging engagement with the other shoe of said pair; and spring means yieldingly opposing movement of all of said shoes lengthwise of the casing.

7. In a friction shock absorbing mechanism, the combination with a friction casing; of an annular series of friction shoes within said casing, said shoes having frictional sliding movement in said casing lengthwise thereof, each of said shoes having wedging engagement with the adjacent shoe at one side thereof, and longitudinal sliding engagement with the shoe on the other side thereof alternate shoes receiving the actuating force; and spring means yieldingly opposing movement of said shoes inwardly of the casing.

8. In a friction shock absorbing mechanism, the combination with a casing; of a central pressure transmitting member; an annular series of six friction shoes surrounding said member, and having sliding frictional engagement with the interior of the casing; a spring within the casing opposing inward movement of three alternate shoes, the remaining three shoes of said series having wedging engagement respectively with said alternate shoes, said remaining shoes having shouldered engagement with said pressure transmitting member to receive the actuating force; and an additional spring yieldingly opposing movement of said three remaining shoes.

9. In a friction shock absorbing mechanism, the combination with a friction casing having interior friction surfaces; of a pressure transmitting wedge member; a group of shoes surrounding said pressure transmitting member and having sliding frictional engagement with the frictional surfaces of said casing, alternate shoes of said group having wedging engagement with said wedge member and the remaining shoes; and spring means opposing movement of said shoes inwardly of the casing including a spring element opposing movement of said alternate shoes only.

10. In a friction shock absorbing mechanism, the combination with an inwardly tapered friction casing; of a plurality of friction shoes having sliding frictional engagement with the casing; and spring means opposing inward movement of said shoes, said shoes being arranged in annular series, certain of said shoes having flat faced engagement along one side edge with the shoe adjacent said side edge, and wedging engagement along the opposed side edge thereof with the shoe adjacent said last named side edge, and being forced inwardly of the mechanism only by said last named shoe which receives the actuating force.

11. In a friction shock absorbing mechanism, the combination with a friction casing; of a plurality of mutually adjacent friction units around the longitudinal axis of the casing, each unit comprising a plurality of friction shoes in wedging engagement with each other, said shoes of each unit having sliding frictional engagement with the interior of the casing, said adjacent units having endwise engagement with each other on faces extending lengthwise of the casing and in planes parallel to the longitudinal central axis of said casing, said shoes of each unit having wedging engagement with each other along adjacent side edges, one of said shoes of each unit receiving the actuating force; and spring means opposing inward movement of all of said shoes of the mechanism.

12. In a friction shock absorbing mechanism, the combination with a friction casing; of an annular series of shoes, each of said shoes having sliding frictional engagement with the casing, certain of said shoes receiving the actuating force and having wedging engagement with the remaining shoes of said annular series; spring resistance means yieldingly opposing movement only of all of said shoes receiving the actuating force; and additional spring resistance means yieldingly opposing movement of all of said remaining shoes.

13. In a friction shock absorbing mechanism, the combination with a friction casing; of an annular series of friction shoes within the casing having sliding frictional engagement therewith, said shoes being arranged in groups of three shoes each, one shoe of each group being disposed between the remaining two shoes thereof, receiving the actuating force, and having edgewise wedging engagement with said remaining two shoes, said remaining two shoes of each group having straight longitudinal edge faces parallel to the longitudinal axis of the mechanism engaging similar edge faces on the outer edges of the corresponding adjacent shoes of the series; and spring means yieldingly opposing inward movement of the shoes of said series.

14. In a friction shock absorbing mechanism, the combination with a friction casing having interior friction surfaces; of a central pressure transmitting element extending into said casing; friction shoes within the casing disposed about said element having sliding frictional engagement with said surfaces, certain of said shoes being engaged by said pressure transmitting element and having wedging engagement with the remaining shoes; a spring buttressed against said remaining shoes and yieldingly opposing movement thereof inwardly of the casing; and a second spring yieldingly opposing inward movement of the shoes only which are engaged by said pressure transmitting element.

STACY B. HASELTINE.